United States Patent [19]

Jasperson

[11] 4,351,912

[45] Sep. 28, 1982

[54] STUCCO COMPOSITION

[75] Inventor: F. Bon Jasperson, Fort Lauderdale, Fla.

[73] Assignee: Northwood Mills Ltd., Toronto, Canada

[21] Appl. No.: 255,834

[22] Filed: Apr. 20, 1981

[51] Int. Cl.$^3$ .............................................. C08K 3/34
[52] U.S. Cl. .................................. 523/218; 523/219; 524/425; 524/426; 524/427; 524/446
[58] Field of Search ............... 260/29.6 S; 106/288 B, 106/291, DIG. 2; 523/218, 219; 524/425, 426, 421, 446

[56] References Cited

U.S. PATENT DOCUMENTS

| | | | |
|---|---|---|---|
| 3,239,475 | 3/1966 | Clark | 260/17 |
| 3,677,988 | 7/1972 | Kimmel | 260/29.6 S |
| 4,010,134 | 3/1977 | Braunisch et al. | 260/29.6 S |
| 4,176,100 | 11/1979 | Rider | 260/22 R |
| 4,222,785 | 9/1980 | Henderson | 106/97 |

FOREIGN PATENT DOCUMENTS 2409116 2/1973 Fed. Rep. of Germany .

*Primary Examiner*—Joseph L. Schofer
*Assistant Examiner*—Bernard Lipman
*Attorney, Agent, or Firm*—Murray and Whisenhunt

[57] ABSTRACT

The present invention is directed to a trowelable, lightweight, synthetic stucco composition containing a crushable, lightweight aggregate, and specifically to the protection of the lightweight aggregate from substantial particle size reduction during troweling application by providing in the composition a protective amount of a hard, non-crushable aggregate having a protective particle size. The hard aggregate is strong enough to resist the troweling step without crushing, and serves to keep the trowel a spaced distance away from the substrate upon which the stucco composition is applied, to thereby substantially prevent crushable, lightweight aggregates of similar or smaller particle size from crushing, and to limit the crushing of crushable, lightweight aggregates having a larger particle size. The invention also includes the method of preventing substantial size reduction of the crushable, lightweight aggregate in the trowelable, lightweight, synthetic stucco composition by the provision of said hard, non-crushable aggregate therein.

18 Claims, No Drawings

STUCCO COMPOSITION

FIELD OF THE INVENTION

The present invention is directed to a trowelable, lightweight synthetic stucco composition and method of applying same.

BACKGROUND OF THE INVENTION

Stuccos based upon cementitious binders have been known to the art for a very long period of time. Such stuccos are similar to plaster compositions, but have aggregates of larger particle size therin, so that a surface which has been covered with the stucco composition has an uneven, textured appearance. In contrast, plaster compositions produce a smooth, finished appearance upon being placed upon a substrate, by, for instance, troweling.

Typical examples of prior art stuccos and/or plasters include those disclosed in U.S. Pat. Nos. 4,245,054, 3,764,357, 2,727,827, 4,188,233, 4,082,562, 3,992,216, and 4,222,785. U.S. Pat. No. 4,222,785, for instance, is directed to an insulating plaster or binder mixture which consists of cement, regular fine aggregate, regular coarse aggregate, volcanic ash in coarse aggregate size, perlite in fine aggregate size and water. It appears that the cement is functioning as a binder, the regular aggregates are performing their normal functions, and the volcanic ash and perlite are utilized for insulating ability and to make the product lighter in weight.

U.S. Pat. No. 4,082,562 is directed to cementitious compositions, such as stuccos, which are freeze-thaw resistant. These materials incorporate porous solid particles, to act in a fashion similar to that of an air void. Pumice, perlite, vermiculite and similar materials may be used.

U.S. Pat. No. 2,727,827 is directed to a lightweight aggregate which can be used in the production of lightweight concrete, plasters and related materials. The aggregate can be a perlite aggregate, which is rendered less friable by treating the expanded perlite to produce a hard aggregate, by maintaining the expanded perlite at an elevated temperature until soft projecting points or burrs fuse or melt into the particle itself.

U.S. Pat. No. 3,764,357 is directed to a method of preparing lightweight concrete and plaster, by coating lightweight aggregates, such as perlite, with dry finely divided cementitious material after wetting the lightweight aggregate surfaces.

U.S. Pat. No. 4,245,054 solves a problem existing in thermally-insulating light stucco or plaster mixtures, namely the separation of an expanded polystyrene additive from the remainder of the dry mixture. The problem is solved by wetting the foam particles with an adhesive solution of aqueous methyl cellulose during the preparation of the dry stucco mixture.

U.S. Pat. No. 2,993,016 is directed to an acoustical and/or heat insulating composition including a lightweight porous aggregate, such as expanded vermiculite or perlite, bentonite or suitable clay binder, an air entraining agent, an optional hydraulic cement, and an organic binder and film-forming agent, which preferably is sodium carboxymethyl cellulose.

U.S. Pat. No. 4,010,134 is directed to a sound-absorbing synthetic resin-based plaster. The plaster mixture includes aqueous synthetic polymer dispersions, suitable organic or mineral pigments, such as titanium dioxide, fillers, such as quartz or calcium carbonate, and optionally known sound absorbers, such as expanded mica or perlite.

U.S. Pat. No. 3,933,579 is directed to vesiculated polymer granules which can be used to produce a matting or texturing effect in paints and polymeric films. The granules may be pigmented with primary white pigments as well as extender pigments.

DETAILED DESCRIPTION OF THE INVENTION

The trowelable, lightweight, synthetic stucco composition of the present invention can be based upon any lightweight, synthetic stucco composition known to the art, with the prior art stucco composition modified by the provision of the protective, hard, non-crushable aggregate.

The aqueous latex used in the stucco composition can basically be any pigmented latex paint. For instance, the paint can be based upon homo- or copolymers of ethylenically unsaturated monomers such as vinyl esters, acrylic and methacrylic acid esters, styrene, ethylene, or vinyl chloride, neoprene, chloroprene, as well as styrene-butadiene copolymers. However, it is greatly preferred to utilize a polymer which is of the nature described in my U.S. Pat. No. 4,256,804, the disclosure of which is hereby incorporated by reference for the disclosure of suitable polymers therein, in the stucco composition of the present invention. Such a polymer, which is preferably an acrylic or vinyl polymer, has an ultimate elongation of at least 250%, when measured in the form of a dried film 7 mils thick and at 90° RH and 78° F., and a visco-elastic flow such as to permit a 7 mil film which is firmly adhered to a surface to withstand, without loss of waterproofing characteristics of the film, development of a crack up to 1 mm in width in the surface, while maintaining film adherence to the surface immediately adjacent the crack, even over extended periods of time of up to as much as 10 years in length. The polymer should also exhibit an adhesion under both wet and dry conditions so that when applied to a substrate it will maintain such adhesion under normal atmospheric conditions.

The PVC (or pigment volume concentration) of the stucco composition of the present invention will be different than the PVC of the waterproofing composition of my U.S. Pat. No. 4,256,804, in that higher PVC's can be tolerated in the stucco composition. Normally the texturizing aggregates are not considered to be part of the pigment.

The aqueous latex in the stucco composition of the present invention must be present at a certain solids content, or else the resultant stucco material will be filled with small holes when applied to a wall and permitted to dry. This is because the spaces between the large texturizing particles must have enough polymeric material to fill in the space. If, for instance, a 62% solids content aqueous latex is used as one of the ingredients of the formulation, it is possible to add an additional small amount of water to the formulation. However, when formulating the same composition but with a 50% solids content aqueous latex, very little, if any, additional water can be tolerated. Thus, it is most important that the amount of resin or polymer in the aqueous latex be at least about the same amount by weight as the amount of water in the stucco composition. In any event, the amount of resin present must be at least 40% of the total weight of resin plus water in the stucco composition to produce a non-porous finish.

The lightweight, crushable aggregate can be any of the conventional aggregates used by the prior art. Suitable aggregates include expanded mica, expanded perlite or vermiculite, formed polystyrene beads, polystyrene sawdust, particles of rigid urethane, melamine, or vinyl foams, and the like. Of these crushable, lightweight aggregates, perlite is preferred. The particle size of the lightweight aggregate can vary depending upon the desired texturizing effect, but normally the average particle size of the perlite will be within the range of 10 to 80 U.S. standard mesh, more preferably within the range of 20 to 80 U.S. standard mesh. The amount of crushable, lightweight aggregate which is utilized can vary, again depending upon the desired texturizing appearance of the resulting stucco finish. Generally, however, the perlite or other lightweight, crushable aggregate will be used in an amount of 25 to 40 volume percent, based on the total volume of the dried stucco composition, and preferably 30 to 35 volume percent.

The hard aggregate must be non-crushable under troweling conditions. That is, the hard aggregate must not be substantially crushed by the pressure applied during normal troweling application of the stucco composition to a surface. The hard aggregate can be any conventional aggregate having the necessary non-crushing property, including calcium carbonate, quartz, other silaceous material including sand, and the like. Calcium carbonate is preferred. The hard pigment must have a particle size such as to provide protection for the lightweight, crushable aggregate. Thus, the choice of particle size of the hard pigment will be dictated by the particle size of the lightweight, crushable pigment which is used, as well as by the amount of crushing of the lightweight aggregate that can be tolerated. While the lightweight aggregate should not undergo substantial crushing, some degree of crushing can be tolerated in many applications. It is greatly preferred that the hard aggregate be approximately the same particle size as the crushable, lightweight aggregate.

The amount of hard aggregate which is used is significantly smaller than the amount of lightweight, crushable aggregate. A few particles of hard aggregate under a trowel applying the stucco to a surface will prevent the trowel from going closer to the surface than approximately the diameter of the hard aggregate, and will therefore prevent crushing of perlite or other lightweight aggregate to a size less than approximately the hard particle diameter. Not only does the presence of the hard aggregate result in a very full, even texture of the stucco finish, but the presence of the hard aggregate improves the trowel-ability of the stucco composition, as the few hard particles underneath the trowel lubricate or act as ball bearings underneath the trowel. For a hard aggregate having a density of that of calcium carbonate, about 2 pounds of the hard aggregate per gallon of stucco composition is approximately the maximum amount of hard aggregate that can be tolerated, as at that point the hard aggregate is starting to dominate the amount of aggregate present in the composition, requiring undesirable reduction in the amount of perlite present. Normally, in order to provide adequate protection to the perlite or other lightweight aggregate present, a minimum amount of the hard aggregate is required. For instance, with XO grade calcium carbonate, a minimum of about ½ pound per gallon of stucco composition is required to provide adequate protection.

Thus, for material having a density similar to that of XO grade calcium carbonate (dry basis density of 13.5 pounds per gallon), from ½ to 2 pounds of such hard aggregate will be utilized per gallon of stucco composition.

For adequate hiding power and opacity, the stucco composition will be pigmented. The pigment may be any conventional paint grade pigment, although titanium dioxide is preferred. The pigment need only be present in an amount to provide adequate hiding power and attractive appearance, but as will be appreciated from the working example hereinafter, a PVC of approximately 10 has been found to be preferred, using titanium dioxide as the pigment.

Conventional additives may be added to the stucco composition if desired, such as, for example, freeze/thaw stabilizers, coalescence, antifoam agents, fungicides, thickeners, surfactants, and the like. Unlike the waterproofing compositions in my U.S. Pat. No. 4,256,804, the greater amount of solid additives (pigment and aggregate) in the stucco composition of the present invention renders the resulting dried surface less tacky, so that a subsequently applied paint coating is not required.

The amount of perlite used in the stucco composition of the present invention will be at least 35% by weight, based on the total weight of pigment and aggregates. Generally, the total amount of perlite will be no more than about 60% by weight, based on the total weight of pigment and aggregates, but in some situations even greater amounts of perlite may be utilized. If less than 35% by weight of perlite is used, based on the total weight of pigment and aggregates, the stucco composition will not have the desired combination of lightweight and stucco-textured finish, so that it is absolutely necessary to utilize at least 35% by weight of perlite in the composition, based on the total weight of pigment plus filler or aggregate.

Because of the light weight of the crushable aggregate which is utilized in the stucco composition of the present invention, the stucco composition is also relatively lightweight so it can be easily handled by the users. This is a decided advantage, especially for use by homeowners and the like. Thus, the total weight of the synthetic stucco will generally be within the range of 11–12 lbs. per gallon, as compared to conventional trowelable stucco compositions having a typical weight of 15–20 lbs. per gallon. Due to crushing of the lightweight aggregates, such conventional stucco compositions normally utilize heavy, non-crushing pigments, which result in a significant weight increase of the resulting stucco composition.

Due to the relatively low amount of water which is present in the stucco composition of the present invention, the hard, non-crushing aggregate must have a very low binder demand, or low level of wetting out of the pigment particles with liquid, as otherwise the hard aggregate may result in a composition which requires an unduly large amount of water in order to wet out all of the ingredients therein, so that the resulting dry film is porous. For visual appearance it is greatly preferred that the dried stucco composition be nonporous. As the stucco composition can also function as a waterproofing composition, for applications wherein waterproofing is contemplated it is critical that the dried film be nonporous.

Generally, the volume of hard aggregate in the synthetic stucco composition of the present invention will be less than one tenth the volume of the lightweight crushable aggregate in the composition.

Generally the weight of lightweight, crushable aggregate will be more than one half of the total weight of the aggregate in the composition. It is preferred that the lightweight, crushable aggregate be more than 40% of the total weight of aggregate and pigment in the stucco composition.

While the description of the present invention has been in terms of the use of a latex as the film-forming component, with water as the solvent, it is clear that the protective hard aggregate of the present invention can also be used in an organic solvent paint system, such as an alkyd stucco paint composition, containing the perlite aggregate or other texturizing crushable aggregate.

WORKING EXAMPLE

A trowelable, lightweight synthetic stucco composition is formulated by mixing together the following ingredients (25 gallon formulation):

| | | |
|---|---|---|
| (1) | Hycar 2600X320, an acrylic resin supplied by B. F. Goodrich in the form of a 50 weight percent emulsion, with the resin having a $T_g$ of 10° F. | 10 gals. |
| (2) | AMP 95, a dispersant sold by IMC | 17.5 fluid ounces |
| (3) | Carbitol acetate, a coupling agent sold by Union Carbide | 51 fluid ounces |
| (4) | Water | 0.2 gals. |
| (5) | CTA 639, a wetting agent sold by GAF Corporation | 215 ml |
| (6) | AMP 95 (see above) | 5 ounces |
| (7) | PMA 100, phenyl mecuric acetate fungicide sold by Cosan Chemical | 0.75 pounds |
| (8) | Disperex A-40, a dispersant sold by Allied Colloids | 240 ml |
| (9) | R-902-18, a titanium dioxide pigment sold by duPont | 25 pounds |
| (10) | B-748, a defoamer sold by Witco | 20 ounces |
| (11) | DF-900, a defoamer sold by Daniel Products | 20 ounces |
| (12) | B-913, a defoamer sold by Witco | 20 ounces |
| (13) | Water | 31 ounces |
| (14) | Perlite, plaster aggregate grade, 10–80 U.S. standard mesh, 65% retained on 40 mesh, 32% retained on 20 mesh, dry basis density of 1.25 pounds per gallon | 37.5 pounds |
| (15) | Calcium carbonate, XO grade sold by Georgia Marble, having a particle size of 16–40 U.S. standard mesh, and a dry basis density of 13.5 pounds per gallon | 25 pounds |
| (16) | Hycar 2600X320 | 6.5 gallons |
| (17) | Gaftex-TT, a thickener sold by GAF Corporation | 345 grams |
| (18) | Water | 34 ounces |

The above ingredients were added in order, with vigorous mixing, except ingredients 4, 5, 6 and 7 were premixed together and added in the form of such mixture, ingredients 10, 11, 12 and 13 were premixed together and added into the composition in the form of such mixture, and ingredients 17 and 18 were premixed together and added in the form of such a mixture. The total volume ratio of perlite to calcium carbonate was 30 gallons of perlite to 1.9 gallons of calcium carbonate. The composition had a volume ratio of perlite having a particle size of +40 mesh to the calcium carbonate of 19.5 gallons:1.9 gallons of calcium carbonate. The PVC of the resulting composition, ignoring the perlite and the calcium carbonate, was approximately 10.

The composition was applied by trowelling to the exterior surface of a store front, over plywood sheathing, and formed a durable textured stucco finish which resisted weathering. No noticeable crushing of the perlite during the trowelling application was noted.

What is claimed is:

1. A trowelable, lightweight synthetic stucco composition for producing a lightweight stucco finish consisting essentially of a pigmented latex paint, a texturizing amount of a crushable, lightweight aggregate of a texturizing particle size, and a protective amount of a hard, non-crushable aggregate of a protective particle size, the crushable aggregate being present in an amount of more than 40% of the total weight of aggregate and pigment in said composition, wherein the hard aggregate protects the crushable aggregate from substantial particle size reduction upon troweling.

2. A trowelable, lightweight synthetic stucco composition consisting essentially of an aqueous latex containing a film forming synthetic polymer in an amount whch is at least about equal to the weight of water in said latex, a tinctural amount of at least one pigment, at least a texturizing amount of a texturizing crushable lightweight aggregate, and a protective amount of at least one hard protective non-crushable aggregate, wherein the volume of the hard aggregate is less than one-tenth the volume of said crushable aggregate and the crushable aggregate being present in an amount of more than 40% of the total weight of aggregate and pigment in said composition, said hard aggregate protecting said crushable aggregate from substantial size reduction during troweling application.

3. Composition of claim 2, wherein said synthetic polymer is an acrylic polymer or a vinyl polymer.

4. Composition of claim 3, wherein said polymer when in the form of a dried residue coating has a Mar elasticity value of at least 1, an ultimate elongation of at least 250% when measured in the form of a film 7 mils thick and at 90° RH and 70° F., and a wet and dry adhesion such as to maintain the coating adhesion to an exterior surface under normal atmospheric conditions.

5. Composition of claim 2 wherein the pigment in said composition is present in an amount corresponding to a PVC (excluding said crushable aggregate and said hard aggregate) of no more than about 14.

6. Composition of claim 2, wherein said hard aggregate is present in an amount of about ½ to about 2 pounds per gallon of said composition.

7. Composition of claim 6, wherein said hard pigment is a pigment which has a low binder demand.

8. Composition of claim 7, wherein said pigment is calcium carbonate.

9. Composition of claim 2, wherein crushable pigment is perlite.

10. Composition of claim 9, wherein said perlite has an average particle size within the range of about 10 to about 80 U.S. standard mesh.

11. Composition of claim 2, wherein the weight of said crushable aggregate is more than one-half of the total weight of aggregate in said composition.

12. In a lightweight synthetic stucco composition consisting essentially of an aqueous latex composition containing at least one film-forming synthetic polymer, and at least a texturizing amount of a lightweight crushable texturizing aggregate, the improvement comprising at least one hard protective non-crushable aggregate in said composition, wherein the volume of said hard aggregate is less than one-tenth the volume of said crushable aggregate, and the crushable aggregate is present in an amount of more than 40% of the total weight of aggregate and any pigment in said composition, said hard aggregate protecting said crushable aggregate from substantial size reduction during troweling operations.

13. In a method of forming a synthetic stucco finish on a substrate, said method comprising providing a trowelable, lightweight synthetic stucco composition consisting essentially of a pigmented latex containing a film-forming synthetic polymer and a texturizing amount of a crushable, lightweight aggregate of a texturizing particle size, and troweling said composition on said substrate, the improvement comprising providing in said composition a protective amount of a hard, non-crushable aggregate of a protective particle size to protect the crushable aggregate from substantial particle size reduction upon said troweling step, wherein the crushable aggregate is present in an amount of more than 40% of the total weight of aggregate and pigment in said composition, whereby an attractive stucco finish is obtained without substantial size reduction of said crushable aggregate during troweling application.

14. Method of claim 13, wherein said synthetic polymer is an acrylic polymer or a vinyl polymer.

15. Method of claim 14, wherein said polymer when in the form of a dried residue coating has a Mar Elasticity Value of at least 1, an ultimate elongation of at least 250% when measured in the form of a film 7 mils thick and at 90% RH and 70° F., and a wet and dry adhesion such as to maintain the coating adhesion to an exterior surface under normal atmospheric conditions.

16. Method of claim 13, wherein said hard aggregate is present in an amount of about one-half to about 2 pounds per gallon of said composition.

17. Method of claim 16, wherein said pigment is calcium carbonate.

18. Method of claim 13, wherein said crushable pigment is perlite.

* * * * *